United States Patent [19]
Truong et al.

[11] Patent Number: 5,327,059
[45] Date of Patent: Jul. 5, 1994

[54] TAPE DRIVE CAPSTAN MOTOR SERVO SYSTEM WITH STATIC FRICTION COMPENSATION

[75] Inventors: Van K. Truong, Harbor City; Edward H. Patrick, Westminster; David E. Woodral, Walnut, all of Calif.

[73] Assignee: Archive Corporation, Costa Mesa, Calif.

[21] Appl. No.: 950,457

[22] Filed: Sep. 24, 1992

[51] Int. Cl.⁵ .......................... H02P 1/28; H02P 1/30
[52] U.S. Cl. ..................................... 318/632; 318/603; 318/560; 318/561; 318/630
[58] Field of Search ................. 318/560–632, 318/6–16, 800–830, 690–780; 360/71–79

[56] References Cited

U.S. PATENT DOCUMENTS

| | | | |
|---|---|---|---|
| 4,706,005 | 11/1987 | Iwako | 318/603 |
| 4,743,848 | 5/1988 | Krimm et al. | 318/696 X |
| 4,828,075 | 5/1989 | Klingbeil et al. | 187/115 |
| 4,833,628 | 5/1989 | Curran, Jr. | 318/729 |
| 4,857,816 | 8/1989 | Rogozinski et al. | 318/632 |
| 4,868,475 | 9/1989 | Rogozinski et al. | 318/632 |
| 4,943,907 | 7/1990 | Godwin | 364/200 |
| 4,963,810 | 10/1990 | Rojas et al. | 318/778 |
| 4,970,610 | 11/1990 | Knappe | 360/75 |
| 4,999,560 | 3/1991 | Morishima et al. | 318/779 |
| 5,079,493 | 1/1992 | Futami et al. | 318/640 |
| 5,204,602 | 4/1993 | Iwashita | 318/630 |

Primary Examiner—Paul Ip
Attorney, Agent, or Firm—Fliesler, Dubb, Meyer & Lovejoy

[57] ABSTRACT

A system and apparatus for startup and speed regulation of low-inertia capstan motors under circumstances where the capstan load during startup may vary widely. A stiction handler provides dynamic control of the motor drive voltage imposed to overcome stationary friction, minimizing the power consumption on startup independently of variations in drag load or motor inertia. A stepped speed-up signal is applied to the motor instead of a conventional constant current-limited signal or sawtooth ramp signal. Motor speed regulation is imposed at each step of a stepped speed-up drive signal. This invention is particularly useful, for example, in low-power magnetic tape drives that must efficiently adapt to variations in drag between one tape cassette or cartridge and another.

18 Claims, 5 Drawing Sheets

TACH COMPARATOR

TAPE DRIVE CAPSTAN MOTOR SERVO SYSTEM WITH STATIC FRICTION COMPENSATION

BACKGROUND OF THE INVENTION

1. Field of the Invention

This invention relates generally to precision motor speed regulation circuitry and, more specifically, to a system for optimizing power consumption and speed regulation in a low-inertia capstan motor.

2. Description of the Related Art

Magnetic tape drives provide a fast and efficient means for storing computer data in large blocks, such as for backing-up the contents of hard disk storage devices. These tape drives, with tape cartridges using 0.25 inch, 8 mm, and 4 mm tape widths, are available for storing data in capacity ranges that match the requirements of small to medium computer systems. For example, commercially available devices can store over 1500 megabytes of digital data on quarter-inch (6.35 mm) magnetic tape in standard cartridges. Such drives can be packaged in the same slot that provides for an industry-standard half-height floppy disk drive.

Streaming magnetic tape drives, also called streamers, are constant-speed tape transports intended for back-up storage of the contents of hard disk drives. Streaming drives usually record data bidirectionally, laying down as many parallel tracks as permitted by tape head technology. Current tape head technology permits about 30 parallel tracks on quarter-inch tape (~5 tracks/mm).

Practitioners in the art have introduced the use of low-inertia motors in tape drives as a technique to reduce power consumption during the motor start-up sequence. These motors are smaller and more economical with power but have low inertia compared to the load. This relatively low inertia causes the motor acceleration to vary proportionally with motor load. Thus, the time required for the low-inertia motor to start up and reach operating speed also varies proportionally with the motor load.

In accordance with specifications generally established by groups such as the American National Standards Institute (ANSI) and the Quarter-Inch Cartridge Committee (QIC), the load on a capstan motor resulting from a QIC tape cartridge can vary from perhaps 0.25 newtons to 1.5 newtons. Therefore, tape cartridge drag varies from cartridge to cartridge over a 6 to 1 range. Also, drag forces can change with age and use of any particular cartridge, depending on frequency of use and operating temperatures. Moreover, the drag imposed on a capstan motor varies directly with tape speed.

Because the cartridge load varies over a 600% range, the motor startup time may vary also by 600% from cartridge to cartridge. This makes it difficult for the tape drive designer to meet the worst-case "up to speed time delay" of 300 milliseconds established in the QIC industry standard equipment specification.

Moreover, the industry standard tape cartridge is designed to withstand a maximum tape acceleration of only 1500 ips/sec (38 m/sec$^2$). Thus, if a drive motor current limit is set to permit a high-drag cartridge to speed up within the worst-case time limit, a low-drag cartridge inserted in the same drive may be destroyed by the startup torque and acceleration of several times the necessary amount. On the other hand, if the motor current limit is set to control the acceleration of a low-drag cartridge, a high-drag cartridge in the same drive will require several times the specified worst-case speed-up time.

Practitioners in the art have suggested several solutions to this problem of optimizing startup-delay and tape acceleration with low-inertia capstan motors employed in streaming tape drives. One class of existing startup techniques applies a fixed drive to the motor in the hope that it will turn before the drive current exceeds the motor limit. Another such class merely starts with half-power, going to full power if the motor does not turn immediately.

Speed ramp-up control techniques in the prior art teach the use of a fixed drive current ramp from an initial value to a full speed value without adjustments for differences in motor responsiveness. Also, the effectiveness of motor speed regulation is limited to a 20–30% range of full speed in the present art.

In U.S. Pat. No. 4,963,810, A. D. Rojas et al disclose a variable load motor drive control circuit for making low inertia motors useful under circumstances where the load on the motor during startup acceleration may vary. Rojas et al employ a ramped drive current as opposed to the earlier, more conventional constant current limit signal. They first provide an initial fixed current to overcome the static friction of the motor and then ramp the current upward at a predetermined rate expected to bring the motor to operating speed without exceeding the desired acceleration. However, Rojas et al neither teach nor suggest means for adjusting the motor drive responsive to actual motor velocity. They merely apply the predetermined drive signal to the motor and wait for a predetermined time, without checking to see if the motor actually starts. Also, Rojas et al do not vary the initial drive level to accommodate differences in starting friction from motor to motor and cartridge to cartridge. Thus, their method is not adaptable to optimizing power consumption by reducing drive current to lightly loaded motors or increasing drive current to force a sticky motor to move within a desired time limit.

In U.S. Pat. No. 4,943,907, Kurt E. Godwin discloses a speed controller for a multi-speed peripheral disk or tape drive that automatically selects a drive speed from among a set of predetermined drive speeds. Godwin neither teaches nor considers drive level regulation responsive to motor load but merely teaches an automatic selection process involving an automated discovery of the maximum common data rate specification between a Central Processing Unit (CPU), its peripheral drive controller and a disk or tape drive.

Thus, there is still a clearly felt need in the art for a tape drive capstan motor controller that optimizes the motor startup power consumption and motor startup time delay for all combinations of motor inertia and tape cartridge drag. The related unresolved problems and deficiencies are clearly felt in the art and are solved by this invention in the manner described below.

SUMMARY OF THE INVENTION

This invention is a static friction handler and speed ramp-up system that solves several of the problems felt in the art. The static friction (stiction) handler employs feedback from Hall effect position sensors in the motor to actively adjust the motor drive signal as minimally necessary to overcome stiction. The speed regulation system of this invention is improved to permit speed regulation over the entire motor speed range. The ramping-up technique of this invention is dynamic in that the motor speed can be regulated at each step along the speed-up curve, as well as at full speed.

It is an objective of this invention that the stiction handler provide the minimum power necessary to overcome the static friction of any particular combination of motor inertia and tape cartridge drag.

It is another object of this invention to minimize power consumption and longitudinal tape stretching forces while maximizing tape acceleration.

It is an advantage of this invention that the stiction handler system limits capstan motor startup acceleration independently of the combined motor inertia and cartridge drag, which avoids tape stretching at startup.

It is another advantage of this invention that the combination of stiction handler and speed regulator systems provide the maximum possible ramp-up tape acceleration in all situations while also limiting motor forces on the tape, thereby avoiding tape stretching during speed-up.

It is an object of the bifurcated "speed table" of this invention that the desired speed regulation precision be specified independently of the desired speed value. It is a feature of the speed regulation system of this invention that each element in the table of predetermined motor speeds is bifurcated into two independent factors, one of which governs the precision of speed regulation and the other which governs the regulated speed value.

The foregoing, together with other objects, features and advantages of this invention will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENT

Figure 1:
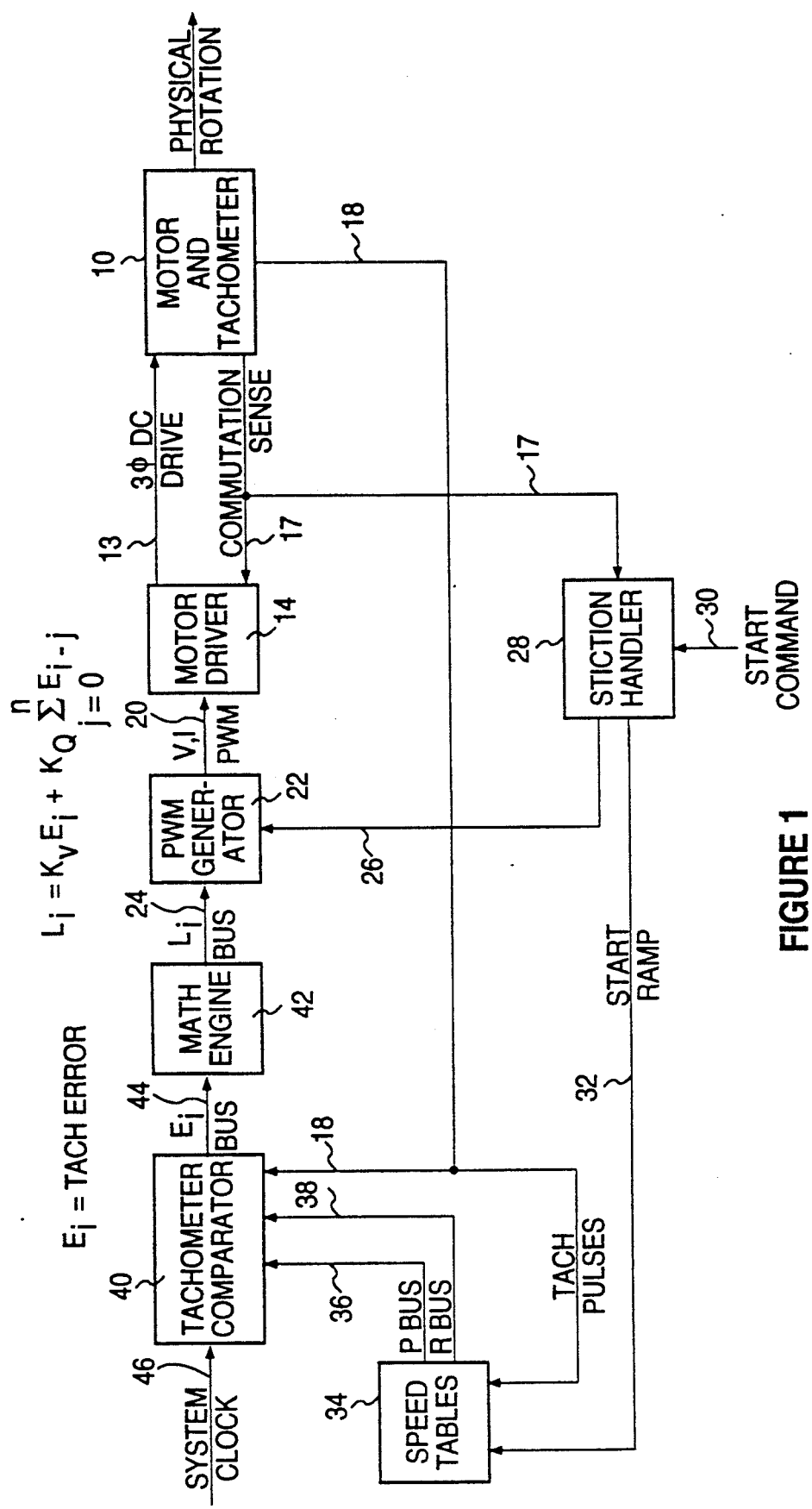
FIG. 1 provides a general block diagram of the motor servo control system of this invention.

FIG. 1 provides a block diagram of the capstan motor servo system of this invention. The motor and tachometer assembly 10 includes a low inertia three-phase DC motor coupled to an optical tachometer. A three-phase DC drive signal is provided on the bus 13 from a motor driver 14 responsive to the three-element commutation sense signals on the bus 17 from assembly 10. The optical tachometer provides a stream of tach pulses on line 18 in any useful manner known in the art for making the tach pulse repetition rate directly proportional to the rotational velocity of the motor in assembly 10.

Motor driver 14 provides the necessary DC levels responsive to an input signal on line 20. In the preferred embodiment of this invention, the signal on line 20 is a Pulse-Width Modulated (PWM) voltage that represents the desired drive voltage V or drive current I that is to be provided by motor driver 14. The duty cycle of the PWM signal on line 20 represents the desired motor drive level, which is proportional to the desired motor rotational velocity.

The PWM signal on line 20 is produced by a PWM generator 22 in response to a motor speed correction factor signal $L_i$ on bus 24 and a stiction handler output signal on bus 26 from the stiction handler 28. Stiction handler 28, responsive to a start command at line 30, signals PWM generator 22 to set the minimal motor drive level necessary to overcome static friction in the capstan motor. After overcoming stiction, the capstan motor begins to turn, providing commutation sense output on bus 17, which is received by stiction handler 28. Responsive to this commutation sense output, stiction handler 28 provides a signal on line 32 that starts the speed ramp-up process from zero speed to a desired operating speed. At the same time, stiction handler 28 sets the output signal bus 26 to zero, leaving only the motor speed correction factor $L_i$ on bus 24 as an input to PWM generator 22.

The purpose of $L_i$ bus 24 is to ramp-up and regulate the capstan motor rotational velocity in accordance with the remainder of this invention. The first of these two features is the ramp-up method of this invention, which is initiated by the start ramp signal on line 32 when it is received by the speed table processor 34.

Speed table processor 34 contains a plurality of number tables, each element of which is associated with a desired rotational speed. Two numbers are used by this invention to signal the desired speed. The first of these numbers is a prescaler number P, which is used for switching speed levels. The second of these numbers is a reference interval number R, used for establishing the desired level of speed regulation precision and accuracy. In general terms, the product of these two numbers P*R is inversely proportional to the desired motor rotational velocity. During the ramp-up interval, new values for P and R are output on the P bus 36 and the R bus 38 responsive to the tach pulses on tach pulse line 18.

Thus, it will be readily appreciated that the preferred embodiment of this invention operates in three distinct phases. The first phase is the stiction handler phase wherein stiction handler 28 takes control of the motor drive until the first signs of physical rotation are received on sense bus 17. The second phase is the ramp-up phase where motor speed moves from zero to a desired operating speed. This is initiated by the start-ramp signal on line 32 and is carried out by speed table processor 34. The final phase is the motor speed regulation phase, which is accomplished by the tachometer comparator 40 and a math engine 42 in accordance with the speed control numbers P and R provided by speed table processor 34.

Tachometer comparator 40 compares the interval between tach pulses on line 18 to the reference interval number R on bus 38 to develop an instantaneous motor speed error $E_i$, which is then transferred on an error bus 44 to math engine 42. Math engine 42 then scales the series of instantaneous speed errors to provide a motor speed correction factor $L_i$ on bus 24 in accordance with the formula shown in FIG. 1 and more particularly described below in conjunction with FIG. 3. Finally, the entire system shown in FIG. 1 proceeds in accordance with the system clock on a clock line 46.

Figure 2:
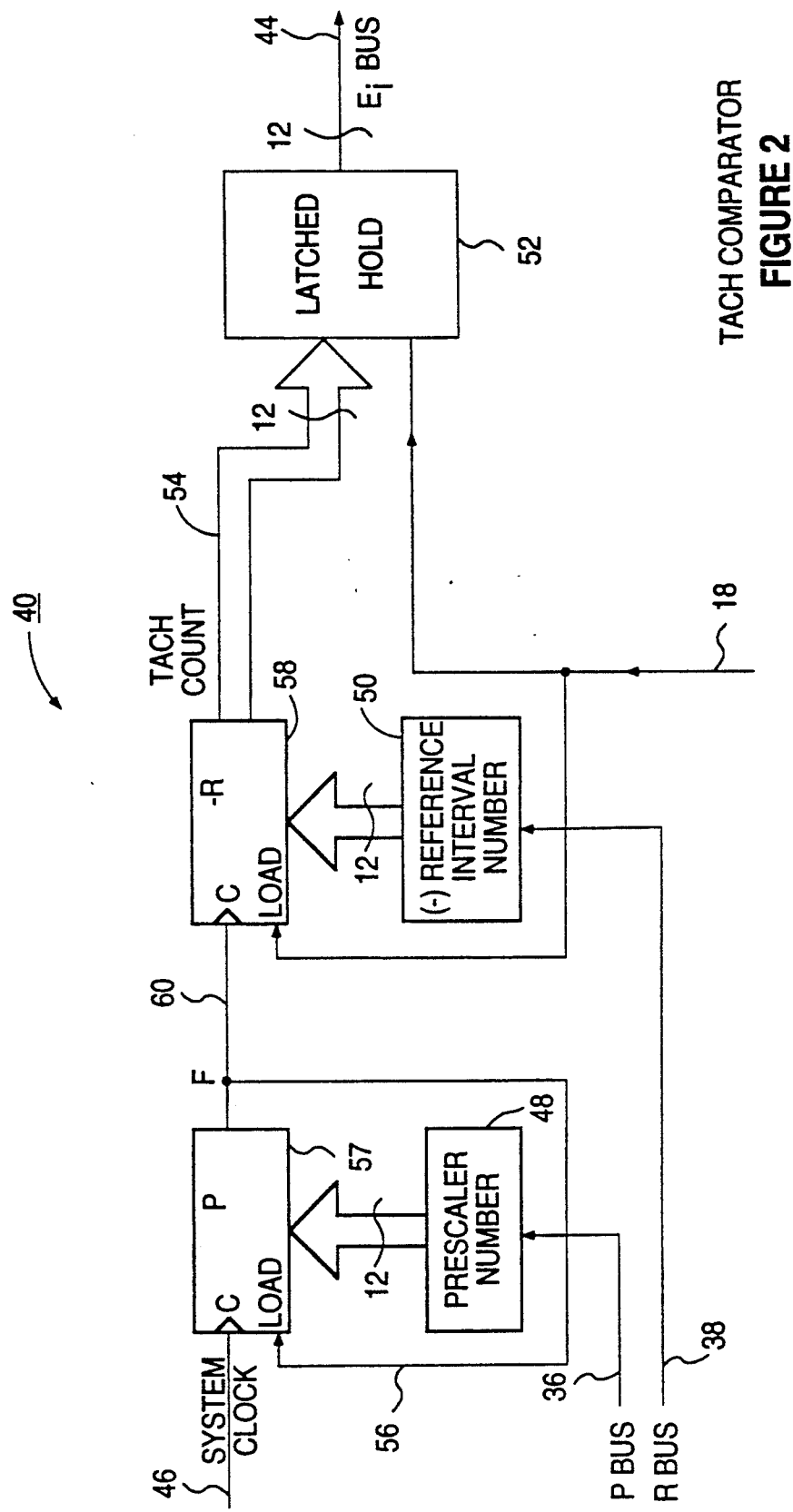
FIG. 2 provides a block diagram of the preferred embodiment of the tach comparator portion of this invention.

The internal operation of tachometer comparator 40 can be appreciated by referring to the detailed block diagram in FIG. 2. Comparator 40 receives the system clock on line 46, a 12-bit prescaler number on P bus 36, a 12-bit reference interval number on R bus 38, and the tach pulses on line 18. It then develops a series of 12-bit instantaneous motor speed errors $E_i$ and provides these on error bus 44. This process is stepped along in response to the tach pulses on line 18. That is, a present $(i)^{th}$ speed error $E_i$ is updated to a next $(i+1)^{th}$ speed error $E_{i+1}$ in response to the next tach pulse on line 18. Otherwise, the internal operation of comparator 40 proceeds responsive to the pulses on system clock line 46.

The first step of this regulation process is the loading of prescaler number P in a register 48 and the negative of reference interval number R in another register 50. P and R are both retained in registers 48 and 50 until updated by signals from speed table processor 34 on busses 36 and 38.

The next step is the receipt of a tach pulse on line 18 by the tachometer latching register 52. A pulse on line 18 causes register 52 to store the tach count word from count bus 54 and reloads the negative reference interval number ($-R$) into the interval timing register 58 from register 50. The contents of register 52 are then presented on error bus 44 to math engine 42 (FIG. 1).

The contents of register 48 are initially loaded into the prescaler register 57. Register 57 then counts in response to the system clock signal on line 46, creating a tachometer clock signal F on a line 60. Tachometer clock signal F on line 60 increments the contents of register 58 and re-initializes prescaler register 57 by reloading the contents of P register 48. The rate of tachometer clock signal F is equal to the system clock rate divided by the value of prescaler P. Thus, the contents of register 58 are incremented from ($-R$) in response to each tachometer clock signal F on line 60.

The contents of register 58 are presented on tach count bus 54 to register 52 at all times. Thus, upon receipt of the next tach pulse on line 18, the present count of register 58 is stored in register 52, representing the difference between the desired number of tachometer clock pulses within a single tach interval and the actual number of tachometer clock pulses within that interval. It will be readily appreciated that the value of this error varies according to the value of prescaler P, reference interval number R and the actual tach interval T between tach pulses on line 18, which represents the reciprocal of actual motor rotational velocity.

Figure 3:
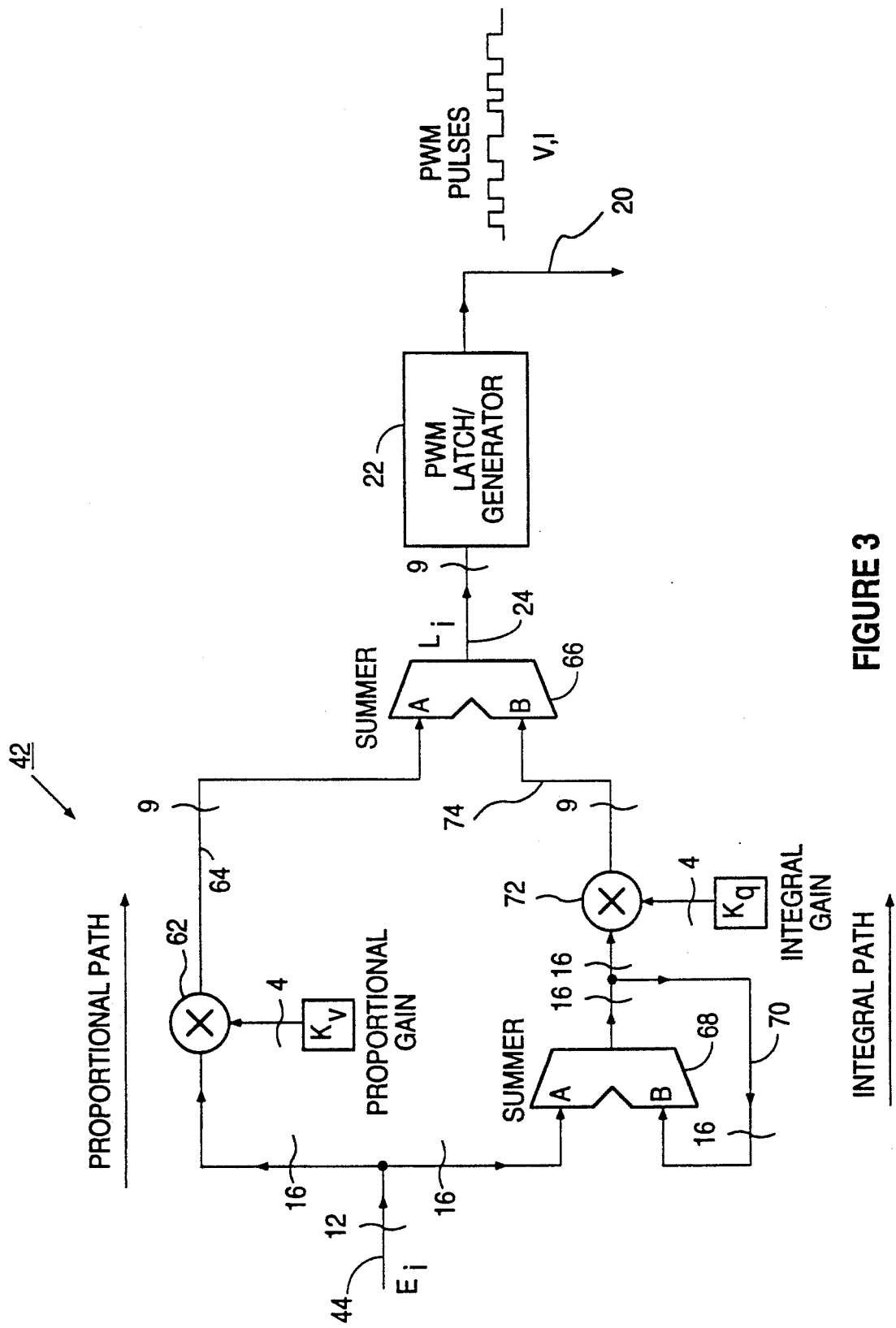
FIG. 3 provides a block diagram of the preferred embodiment of the math engine portion of this invention.

The detailed preferred embodiment of math engine 42 is illustrated in FIG. 3. Math engine 42 converts the 12-bit instantaneous error signal $E_i$ on error bus 44 to an 8-bit motor speed correction factor $L_i$ on bus 24 in FIG. 3. Therefrom, generator 22 creates a corresponding PWM signal on line 20 representing the motor drive voltage V (or current I) necessary in view of the correction factor $L_i$. Thus, it will be appreciated that the output of math engine 42 represents a large plurality of predetermined motor drive voltages (currents), each of which is represented by a PWM signal duty cycle percentage from zero to 100% on line 20.

The motor speed correction factor $L_i$ on bus 24 represents the sum of an instantaneous error correction together with a long-term average error correction. These two elements are shown in FIG. 3 as the "proportional path" and the "integral path" in math engine 42. Considering the proportional path first, the $i^{th}$ 12-bit instantaneous motor speed error $E_i$ is sign-extended to a 16-bit number and multiplied by a 4-bit proportional weighting factor $K_v$ at a multiplier 62. The 16-bit product $K_v E_i$ is stripped to the least significant 8-bit magnitude with sign (bit 9) on bus 64 and presented to a summer 66. If $K_v E_i$ exceeds 8-bits in magnitude, the product on bus 64 is "clipped" to the maximum 8-bit magnitude.

Similarly, the $i^{th}$ 12-bit instantaneous motor speed error $E_i$ is sign extended to 16 bits and added to a 16-bit once-delayed accumulation of all previous such errors $$\sum_{j=1}^{n} E_{i-j} .$$

to create the $i^{th}$ such accumulation $$\sum_{j=0}^{n} E_{i-j}$$

at a summer 68. This $i^{th}$ 16-bit sum is output on bus 70 and is multiplied by a second 4-bit weighting factor $K_q$ at the multiplier 72. The 20-bit product from multiplier 72 is stripped to the least significant 8-bit magnitude with sign (bit 9) on a bus 74 and added to the 9-bit number on bus 64 at summer 66. The 10-bit sum is then stripped to the least significant 8-bit magnitude with sign (bit 9) representing the motor speed correction factor $L_i$ on bus 24. The sign bit is used to control the direction of commutation.

Factor $L_i$ is then converted to a stream of pulses having that one of a plurality of predetermined PWM duty cycles which corresponds to the value of $L_i$ in the PWM generator 22. Because $L_i$ is a signed 9-bit number, 255 such non-zero values may be accommodated. This conversion in generator 22 is accomplished by any useful means known in the art.

Figure 4:
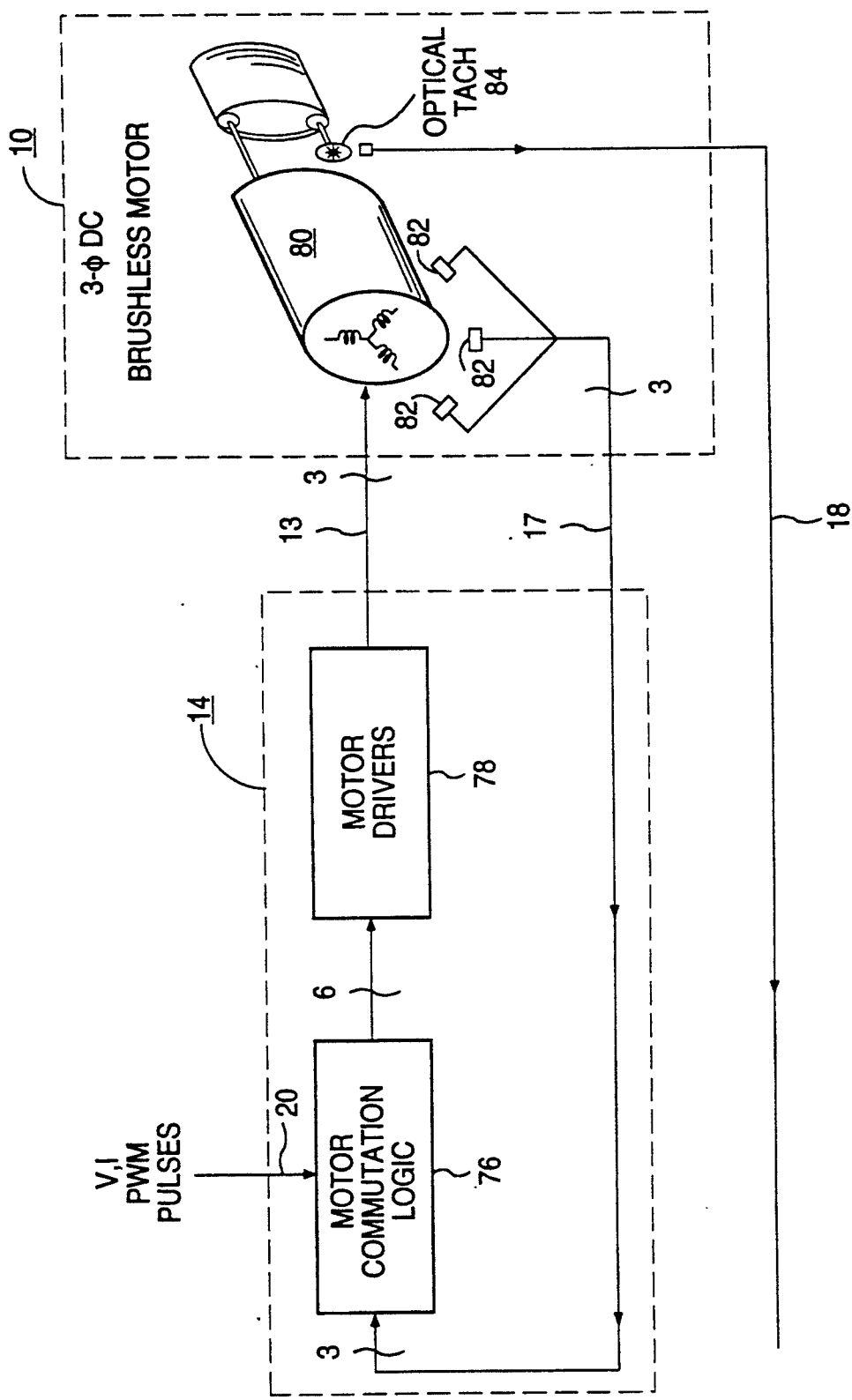
FIG. 4 provides a block diagram of an illustrative embodiment of the motor driver and motor-tachometer assembly suitable for use with this invention.

FIG. 4 presents an illustrative embodiment of motor driver 14 and motor/tachometer assembly 10. Motor driver 14 receives the (V, I) PWM pulses on line 20 as well as the commutation sense signals on bus 17, and generates the three-phase DC drive signals on bus 13. The motor commutation logic 76 combines the signals on three-wire bus 17 and line 20 to produce a 6-bit signal to the motor drivers 78. Motor drivers 78 provide three DC signals to the motor 80 in assembly 10. The three Hall-effect switches 82 provide signals representing the rotational location of each of the three DC motor circuits in a manner well-known in the art. Finally, the optical tachometer 84 is illustrated in FIG. 4 as a simple slotted disk that is directly coupled to the capstan (not shown), which may be belt-coupled to motor 80. Each mark or slot on such disk is sensed optically and converted to a series of tach pulses on line 18 in any useful manner known in the art. Direct capstan coupling of tachometer 84 avoids capstan-speed control error arising from undetected belt slippage.

Figure 5:
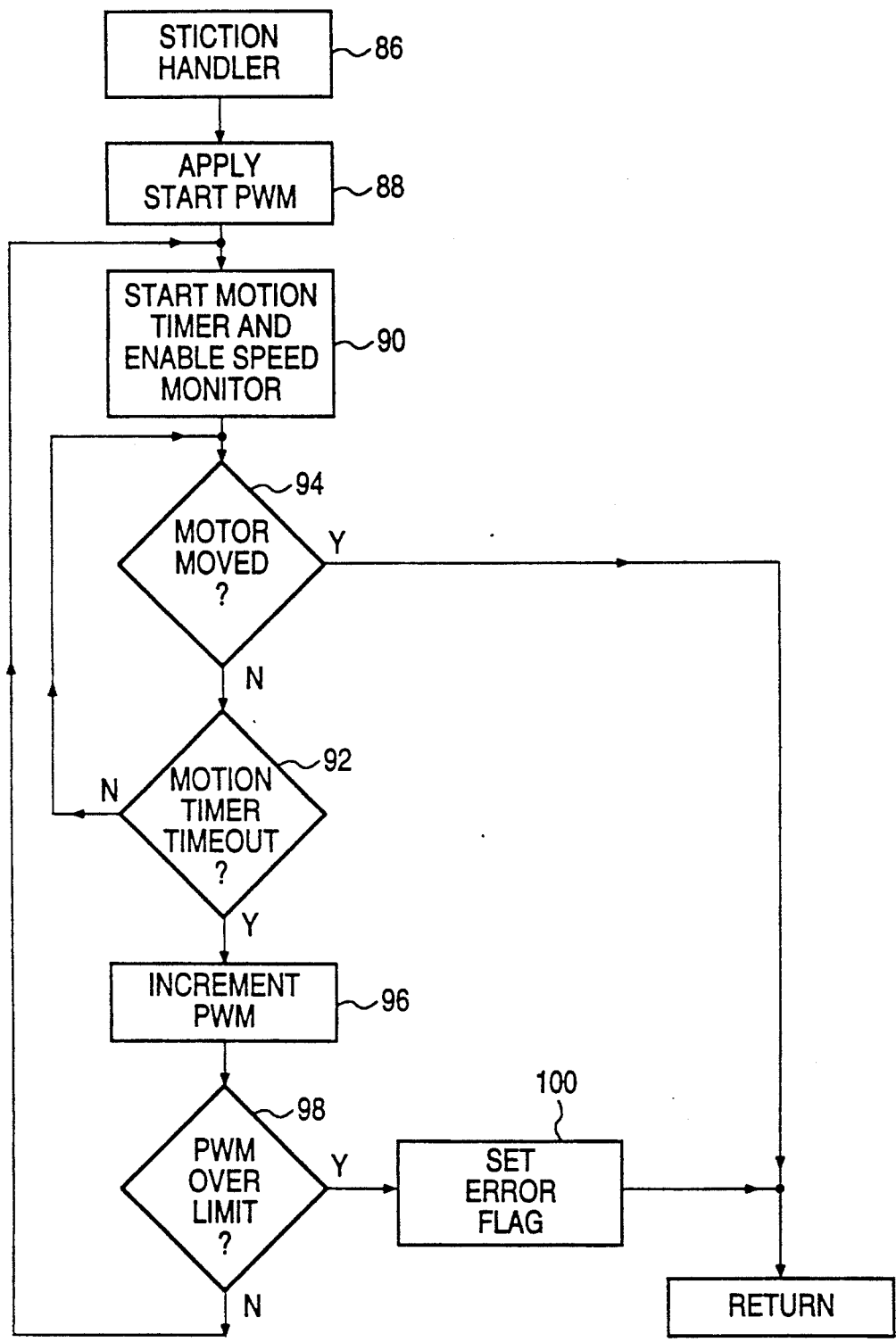
FIG. 5 provides an illustrative embodiment of the stiction handler method of this invention.

FIG. 5 illustrates the procedure of this invention for overcoming static friction (stiction) in motor 80. Stiction handler 28 is initiated in a step 86 by a start command on line 30 in FIG. 1. Thereafter, a first of three or more predetermined motor drive voltages (or currents) is created in response to an output signal on bus 26 (FIG. 1) at the step 88 in FIG. 5. In a step 90, a predetermined time interval clock (not shown) is started and the commutation sense bus 17 is monitored for signs of motor rotation. Until the predetermined time interval expires at the step 92, bus 17 is repeatedly tested in a step 94. As soon as step 94 finds signs of motor rotation, control is returned to speed table processor 34 (FIG. 1). When the predetermined interval expires in step 92, the next in a plurality of predetermined drive voltages (or currents) is selected at a step 96 and the drive voltage (current) is tested against the maximum allowable motor voltage (current) limit in a step 98. If the motor voltage (current) has not exceeded a predetermined threshold corresponding to the safe limit at step 98, the procedure returns to step 90 and repeats. If, for some reason, motor 80 refuses to turn even at maximum drive voltage (current), the motor drive voltage V is set to zero, and an error condition is signaled at a step 100 and control is returned to speed table processor 34 for appropriate action.

Practitioners skilled in the art will appreciate from the above discussion that the capstan motor servo system of this invention includes (a) stiction handler 28 for overcoming static friction, (b) speed-up or ramp-up means in speed table processor 34 for speeding up the motor to a desired operating speed, and (c) speed regulation means for dynamic correction of motor speed errors detected in the tach pulses on line 18. In this invention, for a particular speed, the finest resolution control is achieved by loading the smallest prescaler P and the largest reference interval number R. If R is varied to control speed, a limited range of speed settings results because the larger size of R means that R approaches the maximum permitted word size, thus restricting changes in speed within the small headroom remaining between R and the word size limit. If the headroom is increased to improve the range of speed changes, the response resolution is accordingly reduced. This invention resolves this dilemma by using the prescaler P for speed control. That is, the speed regulation reference number is split into two separate digital words for the first time in this invention. This method permits a wide range of usable speeds without compromising the speed regulation precision at each desired speed value.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specifications and accompanying drawing.

We claim:

1. A power-conserving method for starting motor rotation in a data storage device having a motor, where said motor is to rotate in response to application of a motor drive voltage V and a motor drive current I, said method comprising the steps of:
    (a) applying to said motor a first of a plurality of successively increasing, predetermined motor drive voltage signals, $V_1, V_2, \ldots, V_i$ where i is an integer greater than 2;
    (b) examining said motor for signs of rotational motion;
    (c) applying to said motor a next larger of said plurality of motor drive voltage signals if no said signs of motor rotation are detected during a predetermined time interval; and
    (d) repeating said examining step (b) and said applying step (c) until said signs of rotational motion are detected.

2. The method of claim 1 wherein said applying step (c) comprises the steps of:
    (c.1) before applying to said motor a next larger of said plurality of motor drive voltage signals in the event that no signs of motor rotation are detected during said predetermined time interval:
    (c.2) comparing the recently applied motor drive current I or motor drive voltage V to a first threshold; and
    (c.3) next applying a shutoff voltage signal to the motor if said recently applied motor drive current I or motor drive voltage V is equal to or greater than said first threshold.

3. A method for startup and speed regulation of motor rotation in a data storage device having a motor and a tachometer, wherein the tachometer generates tach pulses in response to rotation of said motor, wherein the time between successive tach pulses, $TP_{i-1}$ and $TP_i$ defines a tach interval $T_i$, and wherein said motor is to rotate in response to an applied motor drive voltage V and an applied motor drive current I, said method comprising the steps of:
    (a) applying to said motor a first of a first plurality of successively increasing, predetermined motor drive voltage signals, $V_{11}, V_{12}, \ldots, V_{1n}$ where n is an integer greater than 2;
    (b) examining said motor for signs of rotational motion;
    (c) applying to said motor a next larger of said first plurality of motor drive voltage signals if no said signs of motor rotation are detected during a predetermined time interval; and
    (d) repeating said examining step (b) and said applying step (c) until said signs of rotational motion are detected;
    (e) after rotational motion is detected and in response to a next received tach pulse, applying to said motor a first of a second plurality of successive, motor drive voltage signals, $V_{21}, V_{22}, \ldots, V_{2i}$ where the last i in the series is an integer greater than 2, said second plurality of predetermined motor drive voltage signals, $V_{21}, V_{22}, \ldots, V_{2i}$ corresponding to a plurality of desired motor ramp-up rotational speeds; and
    (f) repeating said applying step (e) for another of said second plurality of predetermined motor drive voltages $V_{2,i}$ responsive to a subsequent said tach pulse, so that said motor rotation speed is stepped up incrementally to a desired operating speed.

4. The method of claim 3 wherein said applying step (c) comprises the steps of:
    (c.1) before applying to said motor a next larger of said first plurality of motor drive voltage signals in the event that no signs of motor rotation are detected during said predetermined time interval:
    (c.2) comparing the recently applied motor drive current I or motor drive voltage V to a first threshold; and
    (c.3) next applying a shutoff voltage signal to the motor if said recently applied motor drive current I or motor drive voltage V is equal to or greater than said first threshold.

5. The method of claim 3 wherein said applying step (e) comprises the steps of:
    (e.1) loading into a first register an $i^{th}$ prescaler signal ($P_i$) representing a desired regulation precision;
    (e.2) at the receipt of a predecessor tach pulse $TP_{i-1}$, loading into a second register an $i^{th}$ tach interval reference signal ($-R_i$) representing a desired motor rotational speed over an $i^{th}$ interval;

(e.3) after loading the $i^{th}$ tach interval reference signal $(-R_i)$, counting said second register upward at an $i^{th}$ clock rate $F_i$ until a next tach pulse $TP_i$ is received, said rate $F_i$ being proportional to the reciprocal of said $i^{th}$ prescaler signal $(P_i)$;

(e.4) upon receipt of said next tach pulse $TP_i$, storing the contents of said second register into a third register so that the contents of said third register represent an instantaneous motor speed error $E_i$;

(e.5) accumulating said third register contents $E_i$ into a fourth register, said fourth register contents representing a long-term average motor speed error $$\sum_{j=0}^{n} E_{i-j};$$

(e.6) multiplying said third register contents $E_i$ by a first weighting factor $K_v$ and storing the product $K_v E_i$ in a fifth register;

(e.7) multiplying said fourth register contents $$\sum_{j=0}^{n} E_{i-j}$$

by a second weighting factor $K_q$ and adding the product $$K_q \sum_{j=0}^{n} E_{i-j}$$

to the contents in said fifth register, said fifth register contents thereafter representing a motor speed correction factor $L_i$; and (e.8) adjusting said $i^{th}$ predetermined motor drive voltage $V_{2,i}$ responsive to said motor speed correction factor $L_i$.

6. A method for speed regulation of motor rotation in a data storage device having a motor and a tachometer, wherein the tachometer generates tach pulses in response to rotation of said motor, wherein the time between successive tach pulses, $TP_{i-1}$ and $TP_i$ defines a tach interval $T_i$, and wherein said motor is to rotate in response to an applied motor drive voltage V and an applied motor drive current I, said method comprising the steps of:

(a) loading into a first register an $i^{th}$ prescaler signal $(P_i)$ representing a desired regulation precision;

(b) at the receipt of a predecessor tach pulse $TP_{i-1}$, loading into a second register an $i^{th}$ tach interval reference signal $(-R_i)$ representing a desired motor rotational speed over an $i^{th}$ interval;

(c) after loading the $i^{th}$ tach interval reference signal $(-R_i)$, counting said second register upward at an $i^{th}$ clock rate $F_i$ until a next tach pulse $TP_i$ is received, said rate $F_i$ being proportional to the reciprocal of said $i^{th}$ prescaler signal $(P_i)$;

(d) upon receipt of said next tach pulse $TP_i$, storing the contents of said second register into a third register so that the contents of said third register represent an instantaneous motor speed error $E_i$;

(e) accumulating said third register contents $E_i$ into a fourth register, said fourth register contents representing a long-term average motor speed error $$\sum_{j=0}^{n} E_{i-j}$$

(f) multiplying said third register contents $E_i$ by a first weighting factor $K_v$ and storing the product $K_v E_i$ in a fifth register;

(g) multiplying said fourth register contents $$\sum_{j=0}^{n} E_{i-j}$$

by a second weighting factor $K_q$ and adding the product $$K_q \sum_{j=0}^{n} E_{i-j}$$

to the contents in said fifth register, said fifth register contents thereafter representing a motor speed correction factor $L_i$; and (h) adjusting said $i^{th}$ predetermined motor drive voltage $V_{2,i}$ responsive to said motor speed correction factor $L_i$.

7. A motor driver for creating a motor drive voltage for driving a motor having a tachometer coupled thereto, wherein the tachometer generates a plurality of successive tach pulses, $TP_{i-1}$, $TP_i$, $TP_{i+1}$, ..., separated by corresponding time intervals $T_i$, $T_{i+1}$, ..., each time interval $T_i$ being proportional to the reciprocal of the corresponding motor rotational speed, where i is a non-zero positive integer, said driver comprising:

input means for accepting a digital prescaler number $P_i$ representing a desired scaling factor over an $i^{th}$ interval prescaler means coupled to said input means for setting a scaled clock rate $F_i$ responsive to said prescaler number $P_i$;

speed error comparator means coupled to said prescaler means for creating a tach error signal $E_i = T_i - R_i$ representing the difference between the $i^{th}$ time interval $T_i$ and a supplied $i^{th}$ reference tach interval number $R_i$ representing a desired speed;

speed correction means coupled to said speed error comparator means for creating a speed correction signal $$L_i = K_v E_i + K_q \sum_{j=0}^{n} E_{i-j}$$

representing the sum of an $i^{th}$ weighted said instantaneous speed error $K_v E_i$ and an $i^{th}$ weighted average speed error $$K_q \sum_{j=0}^{n} E_{i-j};$$

drive means coupled to said speed correction means for generating an $i^{th}$ motor drive voltage waveform responsive to said speed correction signal $L_i$.

8. The motor driver of claim 7 further comprising:
stiction handling means coupled to said drive means for applying to the motor, at a start-up of the motor, a substantially minimum motor drive voltage V necessary to overcome stationary motor friction.

9. The motor driver of claim 8 further comprising:

speed table processor means coupled to said input means and to said speed error comparator means for defining each said prescaler number $P_i$ and each said reference interval tach number $R_i$ responsive to each said tach pulse, and for thereby stepping the rotational motor speed through a plurality of predetermined motor speed values from motor startup to a predefined, desired motor operating speed.

10. The motor driver of claim 7 further comprising: speed table processor means coupled to said input means and to said speed error comparator means for defining each said prescaler number $P_i$ and each said reference interval tach number $R_i$ responsive to each said tach pulse, and for thereby stepping the rotational motor speed through a plurality of predetermined motor speed values from motor startup to a predefined, desired motor operating speed.

11. A power-conserving method for starting rotation of an electrical motor where the motor is to rotate in response to an applied amount of power VI and where the motor is loaded by static friction, said method comprising the steps of:
   (a) applying to said motor a first of a plurality of successively increasing, predetermined motor drive power signals, $VI_1, VI_2, \ldots, VI_i$ where i is an integer greater than 2;
   (b) examining said motor for signs of rotational motion;
   (c) applying to said motor a next larger of said plurality of motor drive power signals if no said signs of motor rotation are detected during a predetermined time interval; and
   (d) repeating said examining step (b) and said applying step (c) until said signs of rotational motion are detected.

12. The rotation-starting method of claim 11 wherein said step (c) of applying includes:
   (c.1) during the time interval, repeatedly examining said motor for signs of rotational motion; and
   (c.2) if signs of motor rotation are detected during the predetermined time interval, terminating the rotation-starting method.

13. A method for regulating the speed of a motor driven by a motor drive signal, said method comprising the steps of:
   (a) in response to movement of the motor, generating a corresponding series of consecutive tachometer pulses, $TP_{i-1}, TP_i, TP_{i+1}, \ldots$, separated by corresponding time intervals $T_i, T_{i+1}, \ldots$, so that the reciprocal of each time interval $T_i$ corresponds to motor speed in the respective time interval $T_i$;
   (b) for each time interval $T_i$, providing a respective scaling signal $P_i$ representative of a scaling number and a respective reference signal $R_i$ representative of a reference number;
   (c) for each time interval $T_i$, scaling a supplied clock signal in accordance with the scaling signal $P_i$ to produce a correspondingly scaled clock signal $F_i$;
   (d) during each time interval $T_i$, counting the number $N_i$ of pulses in the scaled clock signal $F_i$;
   (e) comparing the counted number of pulses $N_i$ in the scaled clock signal $F_i$ with the corresponding reference number as defined by the respective reference signal $R_i$ and producing a respective error signal $E_i$ representing the difference, $N_1 - R_i$;
   (f) adjusting the motor drive signal in response to each produced error signal $E_i$ so as to drive the speed of the motor to a desired speed value defined by each corresponding scaling signal $P_i$ and each corresponding reference signal $R_i$.

14. The method of claim 13 further comprising the step of defining the reference signal $R_i$ independently of the scaling signal $P_i$ so that for a given scaling number, a range of different reference numbers may be provided.

15. The method of claim 13 further comprising the step of defining a desired speed value using one of a plurality of different sets of the reference signals $R_i$ and corresponding scaling signals $P_i$ in accordance with a level of precision desired for the speed value.

16. An apparatus for starting rotation of an electrical motor where the motor is to rotate in response to an applied amount of power VI and where the motor is loaded by static friction, said apparatus comprising:
   (a) first means for applying to said motor a first of a plurality of successively increasing, predetermined motor drive power signals, $VI_1, VI_2, \ldots, VI_i$ where i is an integer greater than 2;
   (b) second means for examining said motor for signs of rotational motion; and
   (c) third means, responsive to the second means, for applying to said motor in successive predefined time intervals, a next larger of said plurality of motor drive power signals if no said signs of motor rotation are detected during a previous time interval until signs of rotational motion are detected or until a predefined maximum allowed level of power applicable to the motor is exceeded.

17. An apparatus for regulating the speed of a motor driven by a motor drive signal, said apparatus comprising:
   (a) first means, responsive to movement of the motor, for generating a corresponding series of consecutive tachometer pulses, $TP_{i-1}, TP_i, TP_{i+1}, \ldots$, separated by corresponding time intervals $T_i, T_{i+1}, \ldots$, so that the reciprocal of each time interval $T_i$ corresponds to motor speed in the respective time interval $T_i$;
   (b) second means for providing, for each time interval $T_i$, a respective scaling signal $P_i$ representative of a scaling number and a respective reference signal $R_i$ representative of a reference number;
   (c) third means, receiving a supplied clock signal and responsive to said scaling signal $P_i$ for scaling the supplied clock signal in each time interval $T_i$ in accordance with the scaling signal $P_i$ to produce a correspondingly scaled clock signal $F_i$;
   (d) fourth means, responsive to said scaled clock signal $F_i$ and to the provided reference signal $R_i$, for counting during each time interval $T_i$, the number $N_i$ of pulses in the scaled clock signal $F_i$, and for producing a respective error signal $E_i$ representing the difference, $N_i - R_i$ where $N_i$ is the number of pulses counted in the scaled clock signal $F_i$; and
   (e) fifth means for adjusting the motor drive signal in response to each produced error signal $E_i$ so as to drive the speed of the motor to a desired speed value defined by each corresponding scaling signal $P_i$ and each corresponding reference signal $R_i$.

18. The apparatus of claim 17 wherein said second means defines a desired speed value using one of a plurality of different sets of the reference signals $R_i$ and corresponding scaling signals $P_i$ in accordance with a level of precision desired for the speed value.

* * * * *